United States Patent [19]
Felps

[11] Patent Number: 4,772,810
[45] Date of Patent: Sep. 20, 1988

[54] APPARATUS FOR NON-DISSIPATIVE SWITCHING TRANSISTOR SNUBBER

[75] Inventor: Jimmie D. Felps, Colorado Springs, Colo.

[73] Assignee: Hewlett-Packard Company, Palo Alto, Calif.

[21] Appl. No.: 913,788

[22] Filed: Sep. 30, 1986

[51] Int. Cl.[4] ...................... H03K 17/60; H01H 47/00
[52] U.S. Cl. .................................. 307/253; 307/270; 361/84; 361/159
[58] Field of Search .................. 307/253, 270; 361/84, 361/86, 91, 88, 113, 92, 93, 159

[56] References Cited
U.S. PATENT DOCUMENTS

| | | | |
|---|---|---|---|
| 4,010,387 | 3/1977 | Akasmatsu | 307/253 |
| 4,403,269 | 9/1983 | Carroll | 307/253 |
| 4,414,479 | 11/1983 | Foley | 307/253 |
| 4,570,213 | 2/1986 | Ljung | 307/253 |

Primary Examiner—Stanley D. Miller
Assistant Examiner—B. P. Davis
Attorney, Agent, or Firm—Karl E. Bring; Jeffery B. Fromm

[57] ABSTRACT

A high efficiency non-dissipative snubber circuit suitable for most power supplies used in international markets is disclosed. Circuit uses diode-capacitor-inductor structure to capture input voltage equivalent and reverse polarity on snubber capacitor. No external voltage source is required.

6 Claims, 5 Drawing Sheets

4,772,810

APPARATUS FOR NON-DISSIPATIVE SWITCHING TRANSISTOR SNUBBER

BACKGROUND OF THE INVENTION

This invention deals generally with power supplies, and more specifically with non-dissipative switching transistor snubbers.

A switching transistor snubber is circuitry added to a switchmode power supply which reshapes the transistor load line to reduce stresses on the switch transistor, and can also reduce electromagnetic interference (EMI) caused by the switchmode power supply. The switch transistor in a switchmode power supply is turning off into an inductive load which causes a transistor load line as shown in FIG. 1 for no snubber. If the load line is not reshaped by a snubber, circuit peak collector voltages are coincident with peak collector currents as shown in FIG. 2, resulting in maximum power dissipated in the switch transistor.

A dissipative resistor-capacitor (RC) snubber circuit in a single-ended flyback converter is shown in FIG. 3. While transistor $Q_1$ is on, capacitor $C_1$ is charged to a value of $E_{in}$ through resistor $R_1$. When transistor $Q_1$ is turned off, the current from transformer $T_1$, which would pass through transistor $Q_1$ without a snubber, is diverted to capacitor $C_1$ and resistor $R_1$. Power typically dissipated by rsistor $R_1$ is:

$$P = (f)(C_1)(2E_{in})^2.$$

An offline converter using: $C_1 = 2000$ pF, $f = 20$ kHz, and $E_{in}(\max) = 360$ V, would find $P = 20.7$ watts.

A dissipative diode-resistor-capacitor (DRC) snubber circuit for a single-ended flyback converter is shown in FIG. 4. The function of the ciruit is similar to the RC snubber circuit. However, the power consumption, although still high, is approximately halved by shunting resistor $R_1$ with a diode $CR_1$.

A nondissipative diode-inductor-capacitor (DLC) snubber circuit disclosed in a paper titled "DESIGNING NON-DISSIPATIVE CURRENT SNUBBERS FOR SWITCHED MODE CONVERTERS" by Eugene C. Whitcomb at the Proceedings of the Sixth National Solid-State Power Conversion Conference in May 1979 is shown in FIG. 5. This snubber would probably work in a non-dissipative manner for 115 V AC power, but has drawbacks when operating with 230 V AC power. The voltage at the node between resistors $R_1$ and $R_2$ tends to be pulled down by the current drawn through diode $CR_2$. Consequently, capacitor $C_1$ would have to be a high voltage capacitor, rated at approximately 300 Volts or more. This part is physically larger than most standard capacitors, and is less common and therefore more expensive. Common objectives in designing power supplies for international markets include efficiency of power and physical space and adaptability to international power standards (115/230 V).

SUMMARY OF THE INVENTION

In accordance with the illustrated preferred embodiment of the present invention, a practical and efficient non-dissipative switching transistor snubber circuit is realized by adding a diode to a prior art non-dissipative switching transistor snubber and using residual energy in a snubber capacitor resulting from diverting current from the switching transistor during turn-off. The purpose of the snubber circuit is to charge the capacitor to the input voltage, thus shielding the switching transistor from sudden rise times and peak power draws. This circuit takes advantage of the fact that the capacitor is charged to the value it needs at one point in the cycle, but that the polarity is wrong. The added diode holds the correct charge on the capacitor. By using one-half cycle of a resonant LC cycle polarity on the capacitor is reversed. Another diode stops the resonant LC cycle. Since no resistive elements reside in the circuit, the circuit ideally dissipates no power. The circuit works equally well with 115 V or 230 V AC power. This design obviates the need for high voltage capacitors, provides for fewer oscillations, and uses standard, smaller, and more efficent parts.

DESCRIPTION OF THE PREFERRED EMBODIMENT

Figure 2:
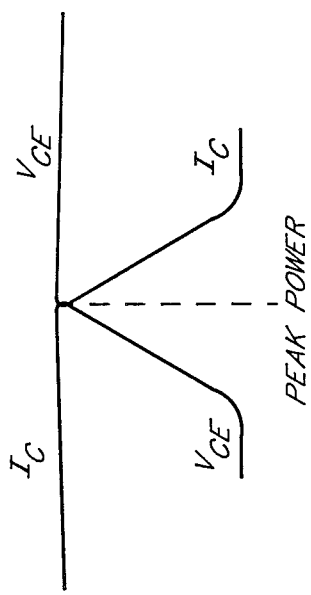
FIG. 2 shows a graph of the collector current $I_c$ vs. the collector voltage $V_{ce}$ for a non-snubbed power supply circuit.
Figure 4:
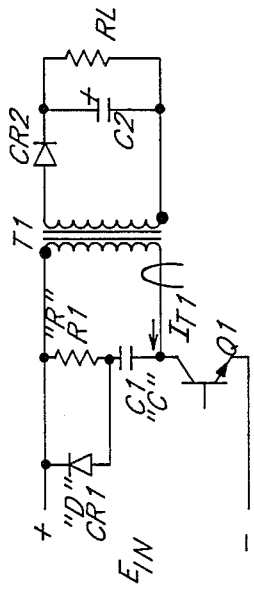
FIG. 4 shows an DRC dissipative snubber circuit for a single-ended flyback converter.
Figure 1:
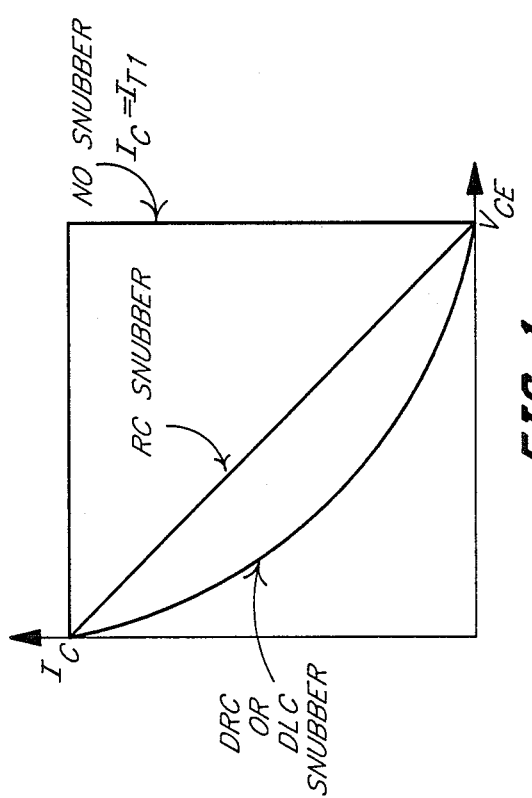
FIG. 1 shows transistor load lines for power supplies having no snubber circuit, an RC snubber circuit and a DRC or DLC circuit.
Figure 3:
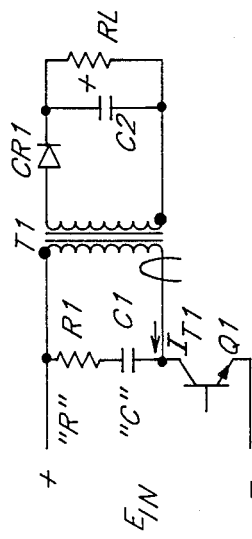
FIG. 3 shows an RC dissipative snubber circuit for a single-ended flyback converter.
Figure 5:
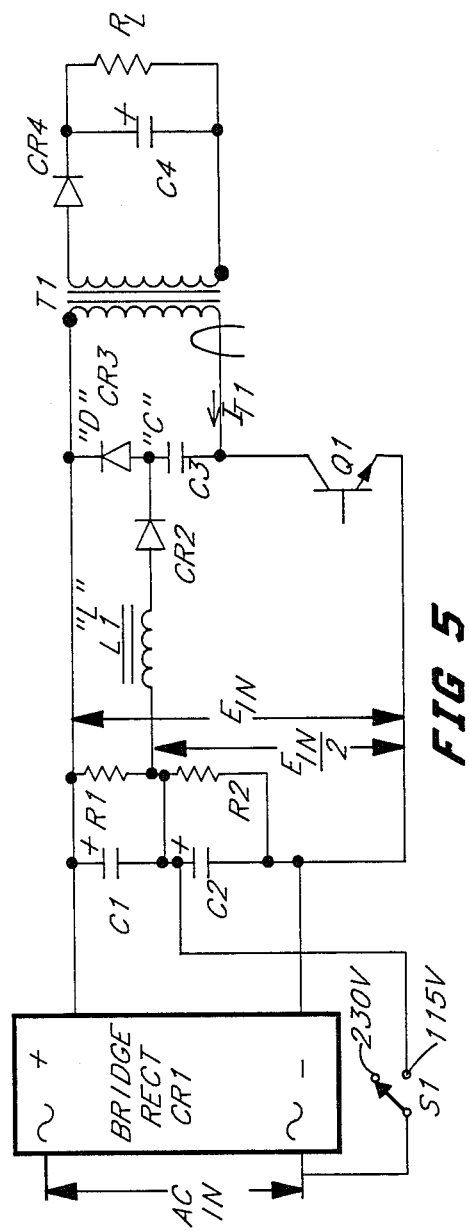
FIG. 5 shows a prior art nondissipative DLC snubber circuit.
Figure 6:
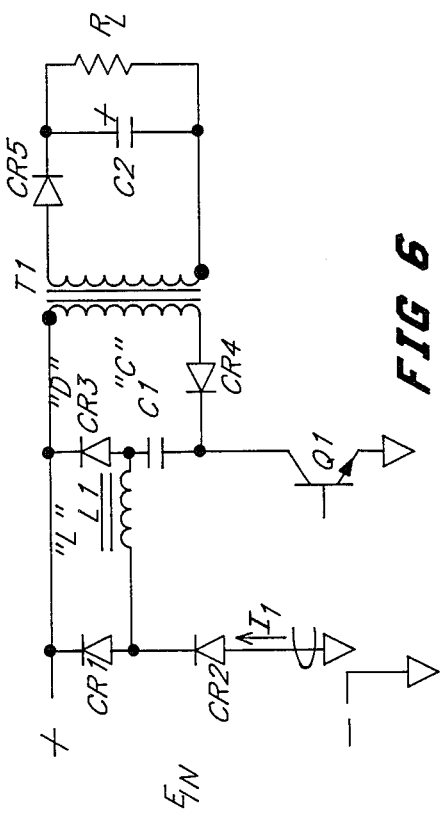
FIG. 6 shows the preferred embodiment of the present invention.

FIG. 6 shows the illustrated preferred embodiment of the present invention. The object of inductor $L_1$ is to place a charge on capacitor $C_1$ equal to or close to $E_{in}$ with a polarity of plus to minus from top to bottom while transistor $Q_1$ is on. Then $C_1$ will divert the transformer primary current from transistor $Q_1$ through capacitor $C_1$ and diode $CR_3$ while transistor $Q_1$ is turning off to relieve the stress in transistor $Q_1$, as shown in the load lines in FIG. 1.

Capacitor $C_1$ becomes charged to a voltage polarity of minus to plus from top to bottom through diodes $CR_3$ and $CR_4$ when the collector voltage of transistor $Q_1$ reaches its maximum value. The voltage across capacitor $C_1$ equals the reset voltage of the transformer $T_1$ primary plus a leakage inductance spike of transformer $T_1$. This voltage can be and usually is greater than $E_{in}$. Diode $CR_4$ prevents capacitor $C_1$ from discharging until transistor $Q_1$ turns back on. The voltage across capacitor $C_1$ is of sufficient value but of opposite polarity of what is desired. Therefore a resonant LC circuit made up of inductor $L_1$ and capacitor $C_1$ reverses the voltage polarity on capacitor $C_1$ during the on time of transistor $Q_1$. Blocking diode $CR_2$ stops oscillation at the end of one-half cycle leaving a voltage charge on capacitor $C_1$ of plus to minus from top to bottom approximately equal to $E_{in}$. Any excess current stored in inductor $L_1$ is dumped back into the source $E_{in}$ through diode $CR_3$.

The amount of time allowed to charge capacitor $C_1$ needs to be less than the on time of transistor $Q_1$ and is determined by:

Charge time $= t = $ period$/2 = [2(\text{pi})(L_1 * C_1)^{(\frac{1}{2})}]/2$ $t = (\text{pi})(L_1 * C_1)^{(\frac{1}{2})}$ where $L_1$ and $C_1$ determine the resonant frequency.

The charging path is from ground through diode $CR_2$, inductor $L_1$, capacitor $C_1$, and transistor $Q_1$ back to ground. In a lossless series resonant circuit (that is allowed to sustain oscillation) the total energy U in the circuit is equal to the energy $U_b$ stored in the air gap (magnetic flux) of an inductor, plus the energy $U_e$ stored in the electric field of a capacitor, or:

$U = U_b + U_e = (\frac{1}{2})L * i^2 = (\frac{1}{2})(q^2)/C$ where i is the current in the inductor and q is the charge in the capacitor.

Figure 9:
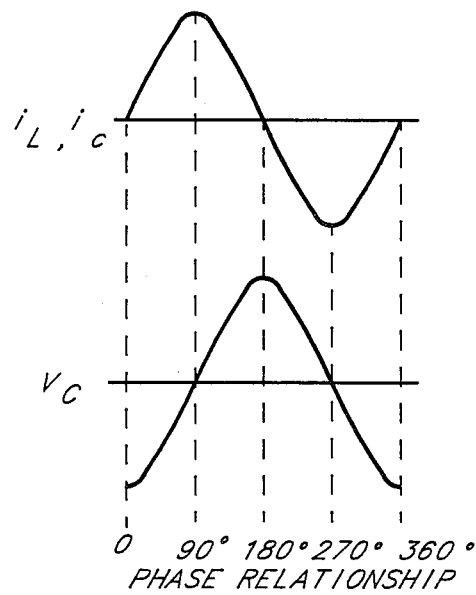
FIG. 9 shows phase relationships for current and voltage in a resonant LC circuit

FIG. 9 shows the phase relationship between current and voltage in an ideal resonant LC circuit. All the energy U will be in the inductor twice during a cyle of oscillation when the current i is at a maximum and flowing in one direction and at a maximum and flowing in the other direction, at 90 degrees and 270 degrees. All the energy will be in the capacitor twice during a cycle, when the capacity is charged to opposite polarities, at 0 or 360 degrees and 180 degrees.

In the snubber circuit shown in FIG. 6, the voltage polarity across inductor $L_1$ of plus to minus from left to right occurs from 0 to 90 degrees. That polarity reverses from 90 to 180 degrees. Current is blocked at 180 degrees by diode $CR_2$ leaving all of the energy in capacitor $C_1$. Diode $CR_3$ serves as a clamp to dump any excess energy back into the $E_{in}$ voltage supply. Due to reverse recovery time in diode $CR_2$, some current is put back into inductor $L_1$ and diode $CR_1$ is required to limit the reverse voltage seen by diode $CR_2$ as inductor $L_1$ oscillates with reverse biased diode $CR_2$ and other stray capacitances. The required voltage has been established on capacitor $C_1$ and the snubber circuit is prepared for transistor $Q_1$ to turn off.

Figure 7:
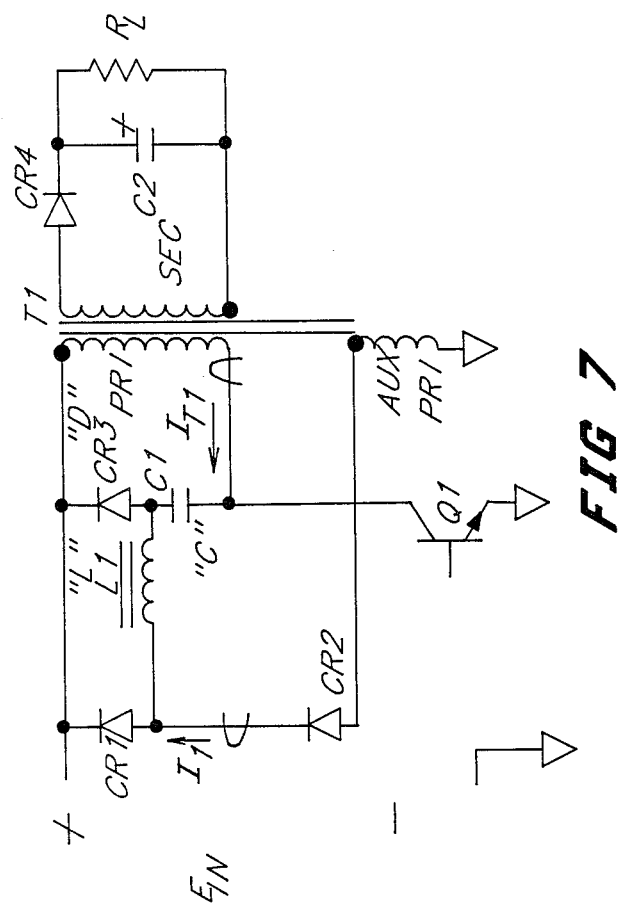
FIG. 7 shows an alternate embodiment of the present invention.
Figure 8A:
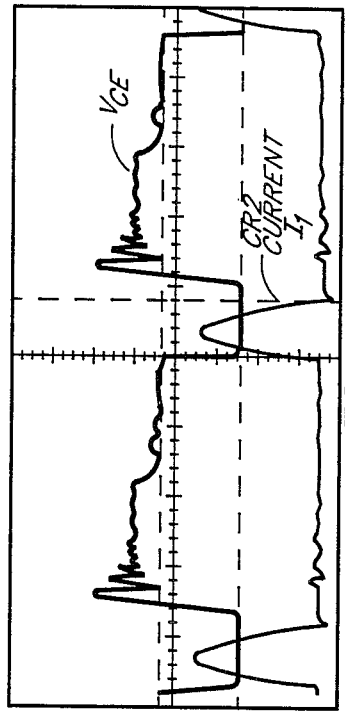
FIGS. 8A and 8B show timing diagrams for collector current $I_c$ and collector voltage $V_{ce}$ for the embodiments of the present invention shown in FIGS. 6 and 7.
Figure 8B:
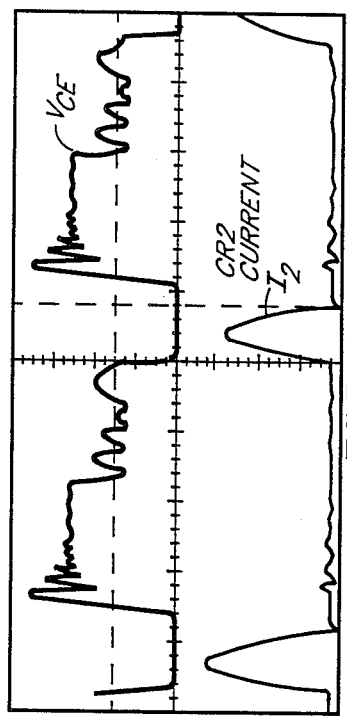

An alternate embodiment of the invention is shown in FIG. 7. Here an auxillary winding provides additional voltage to charge capacitor $C_1$ to $E_{in}$. During the time transformer $T_1$ is transfering energy to the secondary, $V_{ce}$ on $Q_1$ drops down and diode $CR_2$ becomes slightly forward biased by the potential on capacitor $C_1$.

Figure 10:
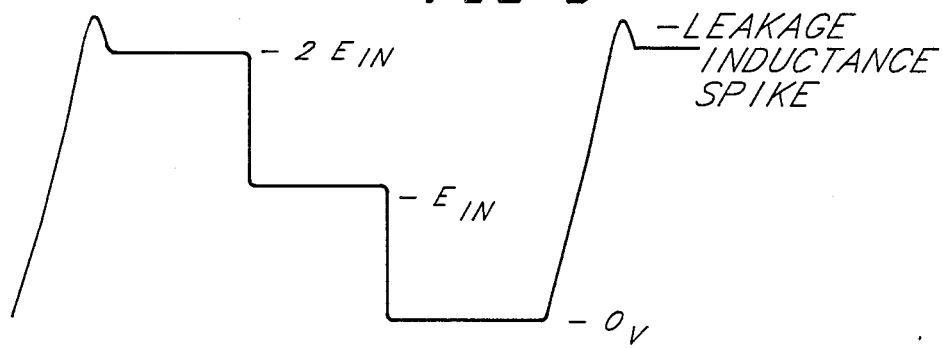
FIG. 10 shows the idealized voltage waveform of the collector for the alternate embodiment.

In an ideal single-ended flyback converter with equal charging and discharging times for transformer $T_1$, capacitor $C_1$ would be left with a charge equal to $E_{in}$ even without the auxillary primary. The idealized waveform at the collector of transistor $Q_1$ is shown in FIG. 10. Just prior to turn-on, the energy has dumped from transformer $T_1$ and $V_{ce}$ returned to a voltage equal to $E_{in}$. The voltage across capacitor $C_1$ would be $E_{in}$ with a polarity of minus to plus from top to bottom because it charges through diode $CR_3$ when the voltage on the collector of transistor $Q_1$ is at its peak value. When transistor $Q_1$ turns on, the resonant circuit formed by diode $CR_2$, inductor $L_1$, capacitor $C_1$ and transistor $Q_1$ would oscillate for one-half cycle (because diode $CR_2$ allows current in only one direction). All of the energy stored in capacitor $C_1$ would transfer to inductor $L_1$ and then back to capacitor $C_1$ leaving capacitor $C_1$ charged to $E_{in}$ again but with a polarity of plus to minus from top to bottom.

Figure 11:
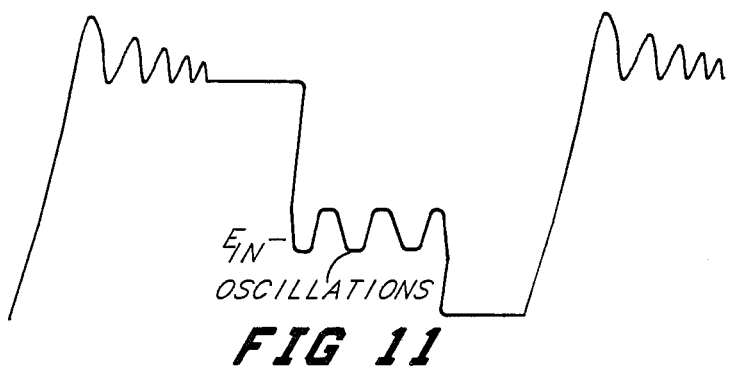
FIG. 11 shows the actual voltage waveform of the collector for the alternate embodiment.

In practice though, the voltage left on capacitor $C_1$ at turn-on is generally considerably less than $E_{in}$ because the collector waveform does not look like FIG. 10. Since the DLC snubber does not dissipate a significant amount of power many different resonant circuits exist during a complete cycle of transistor $Q_1$. Oscillations of these various circuits do not decay much during the time transformer $T_1$ is dumped because of the lack of resistance in the ciruit. The resonant circuit of transformer $T_1$ (primary), capacitor $C_1$, inductor $L_1$, and diode $CR_1$ is likely to be oscillating at turn-on and depending on where energy is stored at turn-on will determine the voltage capacitor $C_1$ can be charged to. Voltage drops caused by diode $CR_2$ and transistor $Q_1$ also represent lost energy due to Joule heating. See FIG. 11.

If at turn-on capacitor $C_1$ happened to have a voltage across it of $(0.7)E_{in}$, then at turn-off transistor $Q_1$ would have to carry all of $I_{T1}$, the current from the transformer until diode $CR_3$ becomes forward biased. Transistor $Q_1$ would have to carry all of $I_{T1}$ until $V_{ce} = (0.3)E_{in}$. So to be able to charge capacitor $C_1$ to $E_{in}$, another winding was put on the transformer (Aux pri) to make up the lost charge on capacitor $C_1$. The turns ratio of $PR_1$:Aux pri equal to 6.33:1 is a good comprimise of sufficient charge on capacitor $C_1$ and excess current that gets dumped through diode $CR_3$. This ratio is not critical and a primary winding may already exist for other functions that can be used. The amount of voltage that is put on capacitor $C_1$ by Aux pri is:

$V_{chg} = 2 (E_{aux})$ in an ideal circuit.

In one example of this embodiment of the invention, inductor $L_1 = 680$ uH and capacitor $C_1 = 2200$ pF. Capacitor $C_1$ must be a high quality capacitor (low dissipation factor) to handle the high peak currents. Wima FKPI capacitors are a good choice. Inductor $L_1$ must also be of high quality. The voltage across inductor $L_1$ is $(E_{in} + E_{aux})$ so the winding must be controlled to prevent winding shorts. Inductor $L_1$ should be a gapped toroid or pot core to contain the magnetic field generated by inductor $L_1$. Efficiency measured on this power supply was 88% where $V_{out} = 120$ V, $I_{out} = 0.45$ A, $P_{out} = 54$ W.

I claim:

1. Apparatus for snubbing of a switch transistor in a switchmode power supply having a power supply having a positive terminal and a grounded negative terminal; an NPN transistor having a base connected to means for switching the transistor, a grounded emitter, and a collector; and a transformer having a primary winding and a secondary winding, each winding having a first and a second end, where the first end of the primary winding is connected to the positive terminal of the power supply; comprising:

capacitive means having a first end connected to the transistor collector and a second end for holding a charge, first diode means having a cathode connected to the first end of the capacitive means and an anode connected to the second end of the primary winding of the transformer for allowing the capacitive means to acquire sufficient charge from the transformer such that the capacitive means voltage is approximately equal to the power supply voltage immediately after the transistor turns of, and for preventing the acquired charge from being dissipated into the transformer while the transistor is off, reversal means having a first end connected to the second end of the capacitive means and a second end connected to ground for reversing the voltage polarity on the capacitive means while the transistor is on, and second diode means having an anode connected to the second end of the capacitive means and a cathode connected to the positive terminal of the power supply for clamping the capacitive means during snubbing and for transferring any excess charge acquired to the power supply during the voltage polarity reversal.

2. Apparatus as in claim 1 wherein the reversal means comprises:

inductive means having a first end connected to the second end of the capacitive means and a second end for discharging the capacitive means by resonation, and for charging the capacitive means by resonation after discharge such that the voltage polarity on the capacitive means is reversed, and third diode means having a grounded anode and a cathode connected to the second end of the inductive means for stopping resonation after the voltage polarity is reversed and the voltage is maximized on the capacitive means.

3. Apparatus as in claim 2, wherein the reversal means further comprises:

fourth diode means having an anode connected to the cathode of the third diode means and a cathode connected to the power supply for limiting reverse bias voltage across the third diode means.

4. Apparatus for snubbing of a switch transistor in a switchmode power supply having a power supply having a positive terminal and a grounded negative terminal; an NPN transistor having a base connected to means for switching the transistor, a grounded emitter, and a collector; and a transformer having a primary winding and a secondary winding, each winding having a first and a second end, where the first end of the primary winding is connected to the positive terminal of the power supply; comprising:

capacitive means having a first end connected to the transistor collector and a second end for holding a charge, reversal means having a first end connected to the second end of the capacitive means and a second end for reversing the voltage polarity on the capacitive means while the transistor is on, auxiliary primary winding means having a first end in phase with the first end of the primary winding of the transformer and a second end in phase with the second end of the primary winding of the transformer; further, the second end of the auxiliary primary winding means is connected to ground and the first end of the auxiliary primary winding is connected to the second end of the reversal means for supplying supplemental charge to the capacitive means such that the capacitive means voltage is approximately equal to the power supply voltage before the transistor turns off, first diode means having an anode connected to the second end of the capacitive means and a cathode connected to the positive terminal of the power supply for clamping the capacitive means during snubbing and for transferring excess charge acquired to the power supply during the voltage polarity reversal.

5. Apparatus as in claim 4 wherein the reversal means comprises:

inductive means having a first end connected to the second end of the capacitive means and a second end for discharging the capacitive means by resonation, and for charging the capacitive means by resonation after discharge such that the voltage polarity is reversed on the capacitive means, and second diode means having a cathode connected to the second end of the inductive means and an anode connected to the first end of the auxiliary primary winding means for stopping resonation after the voltage polarity is reversed and the voltage is maximized on the capacitive means.

6. Apparatus as in claim 5, wherein the reversal means further comprises:

third diode means having an anode connected to the cathode of the second diode means and a cathode connected to the power supply for limiting reverse bias voltage across the second diode means.

* * * * *